(12) United States Patent
Brenner et al.

(10) Patent No.: US 7,284,337 B2
(45) Date of Patent: Oct. 23, 2007

(54) PROBE HEAD FOR A COORDINATE MEASURING MACHINE

(75) Inventors: Kurt Brenner, Satteldorf (DE); Walter Jenisch, Heidenheim (DE); Horst Stacklies, Aalen (DE); Roland Roth, Waldstetten (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 11/106,701

(22) Filed: Apr. 14, 2005

(65) Prior Publication Data

US 2005/0229420 A1   Oct. 20, 2005

Related U.S. Application Data

(63) Continuation of application No. PCT/EP03/11473, filed on Oct. 16, 2003.

(30) Foreign Application Priority Data

Oct. 23, 2002 (DE) ................. 102 50 812

(51) Int. Cl.
*G01B 7/004* (2006.01)
(52) U.S. Cl. .......................... 33/558; 33/503
(58) Field of Classification Search .................. 33/558, 33/556, 559, 561, 503; 324/207.2
See application file for complete search history.

(56) References Cited

U.S. PATENT DOCUMENTS

| | | | | | |
|---|---|---|---|---|---|
| 3,902,252 | A | * | 9/1975 | Farber ........................... | 33/361 |
| 4,084,323 | A |   | 4/1978 | McMurtry .................... | 33/561 |
| 4,098,001 | A | * | 7/1978 | Watson ......................... | 33/644 |
| 4,155,169 | A | * | 5/1979 | Drake et al. .................. | 33/644 |
| 4,337,579 | A | * | 7/1982 | De Fazio ...................... | 33/644 |
| 4,414,750 | A | * | 11/1983 | De Fazio ..................... | 267/166 |
| 4,703,261 | A | * | 10/1987 | Berchtold ................. | 324/207.2 |
| 4,866,854 | A | * | 9/1989 | Seltzer ......................... | 33/558 |
| 5,174,039 | A | * | 12/1992 | Murai .......................... | 33/556 |
| 5,326,982 | A |   | 7/1994 | Wiklund ................. | 250/559.19 |
| 5,493,216 | A | * | 2/1996 | Asa .......................... | 324/207.2 |
| 6,215,299 | B1 | * | 4/2001 | Reynolds et al. ......... | 324/207.2 |
| 6,633,157 | B1 | * | 10/2003 | Yamaki et al. ........... | 324/207.2 |
| 7,112,956 | B2 | * | 9/2006 | Shibata et al. ......... | 324/207.25 |
| 2002/0005715 | A1 | * | 1/2002 | Sato ....................... | 324/207.2 |
| 2005/0229420 | A1 | * | 10/2005 | Brenner et al. ............... | 33/558 |

FOREIGN PATENT DOCUMENTS

DE          26 20 099 C2     12/1976

(Continued)

OTHER PUBLICATIONS

Joe Gilbert et al., "Linear Hall-Effect Sensors", 1998 Allegro MicroSystems, Inc., pp. 1-12.
1997 Allegro MicroSystems, Inc., "Hall-Effect IC Applications Guide", pp. 1-36.

*Primary Examiner*—R. Alexander Smith
(74) *Attorney, Agent, or Firm*—Harness, Dickey & Pierce, P.L.C.

(57) ABSTRACT

A probe head for a coordinate measuring machine has a stylus resiliently suspended in a housing. A sensor arrangement serves for detecting deflections of the stylus relative to the housing. The sensor arrangement comprises at least one Hall sensor having a magnet and a Hall element arranged in a vicinity to each other. When the stylus is deflected, the magnet is laterally passed by the Hall element in a direction defined from the North Pole to the South Pole of the magnet or vice versa. A Hall voltage of changing polarity can be tapped at the Hall element then. A preferably linear range around the polarity change is processed in order to determine the deflection of the stylus.

11 Claims, 6 Drawing Sheets

FOREIGN PATENT DOCUMENTS

| | | |
|---|---|---|
| DE | 37 21 682 A1 | 4/1988 |
| DE | 37 08 105 A1 | 9/1988 |
| DE | 37 15 698 A1 | 12/1988 |
| DE | 37 20 524 A1 | 12/1988 |
| DE | 196 39 801 A1 | 4/1998 |
| DE | 197 12 829 A1 | 10/1998 |
| DE | 198 58 214 C2 | 7/2000 |
| DE | 198 23 059 C2 | 11/2000 |
| GB | 2 238 616 A | 6/1991 |

* cited by examiner

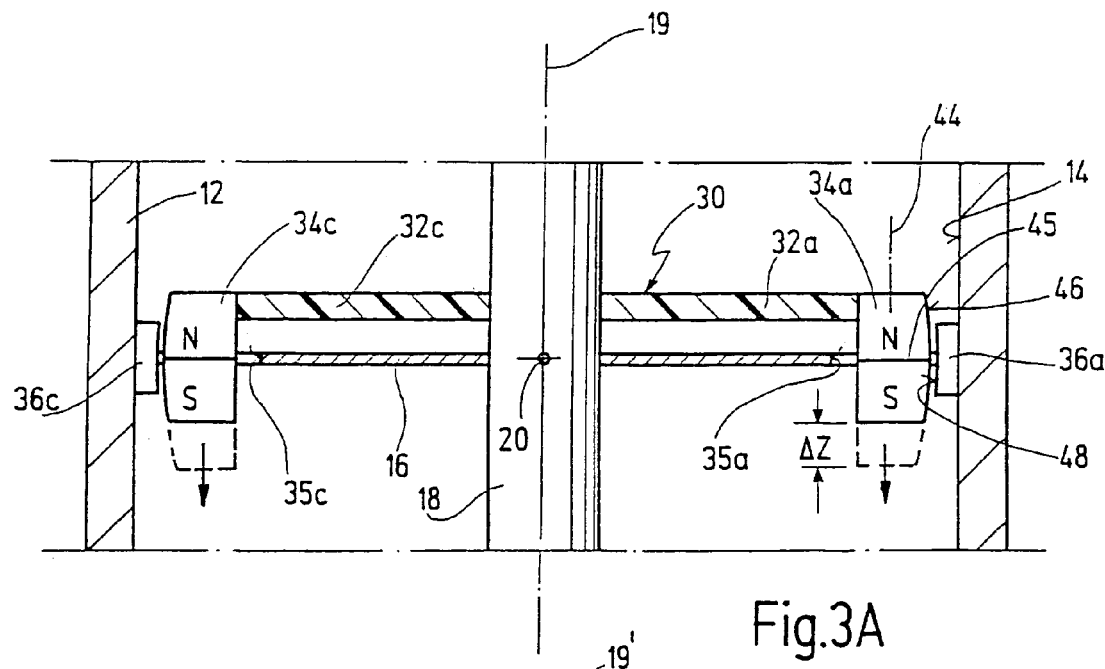
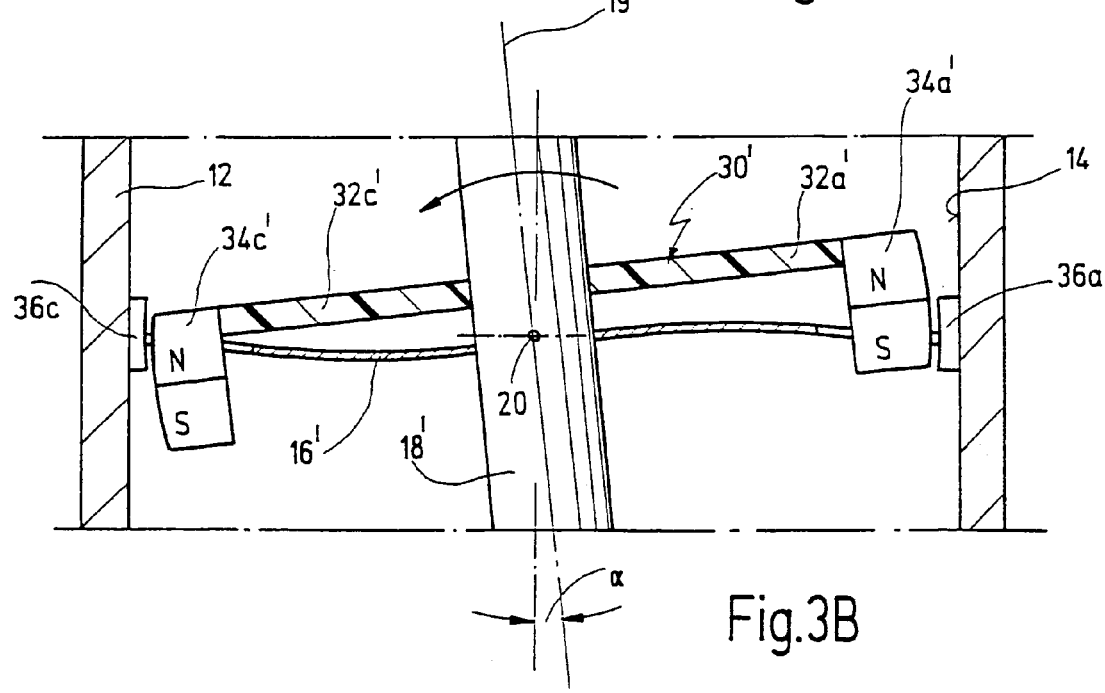

PROBE HEAD FOR A COORDINATE MEASURING MACHINE

RELATED APPLICATIONS

This application is a continuation of copending international patent application PCT/EP2003/011473, filed on Oct. 16, 2003 and published in German language, which claims priority from German patent application DE 102 50 812.7 filed on Oct. 23, 2002.

BACKGROUND OF THE INVENTION

The invention generally relates to a probe head for a coordinate measuring machine. More specifically, the invention relates to a probe head comprising a stylus resiliently suspended in a housing, and a sensor arrangement for detecting deflections of the stylus relative to the housing.

A prior art probe head designed for determining dimensions of a shaft is disclosed by DE 37 21 682 A1. This probe head has an elongated arm with a spherical probe tip that bears against the circumference of a rotating shaft. The arm is part of a parallelogram-type structure whose articulations are formed by segments of diminished cross section that are designed in the manner of film hinges. The entire arrangement is designed in a single-piece fashion. In order to convert the movement of the arm with the probe tip into an electrically detectable signal, use is made of an inductive sensor arrangement in which a core moved indirectly by the probe tip dips into a measuring coil. As an alternative embodiment, a Hall element is proposed, but without specifying any details of the arrangement or the evaluation of the Hall voltage.

DE 198 23 059 C2 discloses a method and a device for detecting the spatial position of a body. Use is made of an array of 4×4 sensors, such as Hall sensors.

DE 37 08 105 A1 discloses a measuring probe for a coordinate measuring machine that proposes magnetoresistive sensors for three-dimensional position measurements. A stylus is situated with one of its poles opposite a resistor dependent on a magnetic field, the deflection of the stylus effecting a variation in the spacing between the magnetic pole and resistor.

DE 26 20 099 C2 discloses a probe head with a stylus that can be deflected in all directions. In order to measure and detect a movement of the stylus, use is made of an inductive sensor arrangement in which there are provided two inductive sensors on each of all three axes. The sensors are arranged on opposite sides of the stylus. The inductive sensors are connected up to form a bridge circuit.

DE 37 20 524 A1 discloses a caliper rule having a Hall sensor. The Hall sensor is located next to a magnet such that, in the absence of a ferromagnetic disturbance, the Hall element is penetrated symmetrically by the field lines of the magnet, the Hall voltage thereby being precisely zero. If a runner with the Hall sensor is displaced on the bar, ferromagnetic rungs of a ladder-type arrangement run past the Hall sensor and distort the magnetic field, with the consequence that the Hall element is permeated asymmetrically by field lines, a finite Hall voltage thereby being produced. The Hall voltage is fed to a threshold stage that forms pulses, which are subsequently counted in, order to determine the position of the runner on the bar.

DE 197 12 829 A1 discloses a device for detecting the position of a piston in a pneumatic cylinder. A Hall voltage with a polarity change is utilized, specifically by laterally passing a Hall by a magnet. The Hall signal is further processed by means of threshold stages.

DE 196 39 801 A1 discloses a sensor arrangement for detecting the position of movable parts by means of a Hall sensor in which the Hall sensor is laterally passed by a magnet in order to control a windscreen wiper system for a motor vehicle. Again, use is made of a threshold stage in order to process the Hall signal.

SUMMARY OF THE INVENTION

Against this background, it is an object of the invention to provide a probe head for a coordinate measuring machine that allows a high-resolution measurement, preferably in three coordinate directions, with a low outlay on apparatus and at low costs.

According to one aspect of the invention, this object is achieved with a probe head, wherein a magnet is laterally passed by a Hall element such that a Hall voltage of changing polarity is generated, and wherein a range of the Hall voltage that lies around the polarity change is processed as a continuous measure of the deflection of the stylus.

It is thus proposed to measure the deflection of the stylus in any coordinate direction by means of a Hall sensor. Generally, only a single Hall sensor per coordinate direction is required here, even though for other reasons two or four Hall sensors can be advantageous for certain applications, as will be explained further on.

By contrast to known probe heads for coordinate measuring machines, a substantial reduction of the number of active measuring elements can be achieved. It is an advantage that the Hall voltage profile is evaluated not only in the sense of a threshold value detection. Rather, the present invention turns to its advantage the fact that the Hall voltage profile as a function of travel is linear over a relatively wide range in the region of the zero crossing such that continuous detection and processing of measured values is possible here.

In preferred embodiments of the invention, the range is substantially linear.

This measure has the advantage that it is possible to process measured values more simply when, for example, an inherently nonlinear characteristic curve of a Hall element is linearized, for example by means of previously determined correction values.

In a preferred refinement of the inventive probe head, there is defined a plane in the housing, which plane forms a radial plane of the stylus in the rest position of the stylus. Preferably, the stylus is adapted to swivel about a fulcrum lying in the plane, and the stylus is provided with at least one first magnet and the housing is provided with at least one first Hall element, or vice versa, in order to detect the swiveling.

It is particularly preferred in this context when at least one first magnet is arranged with its axis parallel to the axis of the stylus and, in the rest position of the stylus, it is located in the plane with its symmetry plane defined between its poles.

This measure has the advantage that accurate measurements are possible in the so-called X-Y plane.

In a specific exemplary embodiment, the stylus is cardanially suspended in the plane by means of a diaphragm, and the first magnet and the first Hall element project into a first cutout in the diaphragm.

This measure has the advantage that the measurement of the X-Y deflection in the cardan plane is possible without the elements required for this purpose causing an obstruction.

It is particularly preferred in this context when the first magnet is arranged on a holder extending radially away from the stylus, and the first Hall element is arranged on an axially extending inner wall of the housing.

This measure has the advantage of intensifying the swiveling of the stylus over the length of the holder, the arrangement of the Hall element on the inner wall of the housing corresponding to a maximum length of the holder.

In further embodiments, at least one first magnet is arranged with its axis orthogonal to the axis of the stylus, and the first magnet is located on a first holder extending radially away from the stylus and at an axial distance from the fulcrum, and the first Hall element is located on a radially extending inner wall of the housing.

This embodiment has the advantage that the elements required for detecting the swiveling in the X-Y plane can be spatially separated from one another and can therefore be implemented more simply.

In further embodiments of the invention, there is defined a longitudinal axis in the housing which axis coincides in the rest position of the stylus with a longitudinal axis of the stylus, wherein the stylus is elastically displaceable along its longitudinal axis, and wherein the stylus is provided with at least one second magnet, and the housing is provided with at least one second Hall element, or vice versa, for detecting the displacement This embodiment relates to measurements along the so-called Z-axis, which can likewise be carried out in an advantageous manner within the scope of the present invention.

This holds, in particular, whenever the stylus can be swiveled about a fulcrum lying in the plane, wherein the second magnet is arranged with its axis parallel to the axis of the stylus and, in the rest position of the stylus, it is located in the plane with its symmetry plane defined between its poles.

This measure also has the advantage that very precise measurements can be carried out even if the sensor arrangement of the Z-axis is located in the cardan plane of the stylus.

In another embodiment, the stylus is cardanically suspended in the plane by means of a diaphragm, and the second magnet and the second Hall element project into a second cutout in the diaphragm.

This method has the advantages already mentioned above, namely that the required elements can all be arranged in the plane of the diaphragm without risk of collision.

Furthermore, with the abovementioned exemplary embodiments of arrangements for measuring the displacement on the Z-axis, it is particularly preferred when the second magnet is arranged on the stylus, and the second Hall element is arranged on a holder extending radially away from an inner wall of the housing.

This arrangement, which is thereby designed in a fashion directly opposed to the arrangement of the sensor elements for measurements in the X-Y plane, thus likewise has the advantage of being able to carry out particularly precise measurements that are independent on the Z-axis of a simultaneous deflection in the X-Y plane.

It is preferred in another exemplary embodiment when the second magnet is arranged with its axis parallel to the axis of the stylus and, in the rest position of the stylus, is located with its symmetry plane defined between its poles at a spacing from the plane.

This measure has the advantage that a simpler construction is possible owing to the spatial separation of the measuring elements, on the one hand, and of the cardan plane, on the other hand.

In the case of the last named exemplary embodiment, a particularly good action is further obtained by virtue of the fact that two magnets are provided at an axial spacing from one another.

This measure has the advantage that the direction of the displacement along the Z-axis can be reliably detected.

Finally, it is preferred in this context when the second magnet is arranged on the stylus, and the second Hall element is arranged on a holder extending radially away from an inner wall of the housing.

This measure has the advantage already mentioned that precise measurements are possible on the Z-axis even if the stylus is simultaneously being swiveled in the X-Y plane.

It is particularly preferred in the case of all the abovementioned embodiments when a plurality of Hall sensors, in particular four first Hall sensors or two second Hall sensors, are arranged distributed over a circumference of the probe head.

This measure has the advantage that differential measurements are possible such that, for example, during measurement of the swiveling in the X-Y plane only an inverse signal change is detected at oppositely situated sensors, while a change in the same direction is disregarded because it results from a movement of the stylus along the Z-axis, which is not to be detected by the first Hall sensors, but by the second ones.

Finally, it is particularly preferred within the scope of the present invention when at least magnets and/or Hall elements serving for detecting swiveling are provided with a spherical surface, the radius of the surface corresponding to the radius of the swiveling movement.

This measure has the advantage that the air gap between the elements of the Hall sensor remains constant when they are swiveled relative to one another.

Further advantages follow from the description and the attached drawing.

It is self-evident that the features mentioned above and those still to be explained below can be used not only in the respective specified combination, but also in other combinations or on their own without departing from the scope of the present invention.

BRIEF DESCRIPTION OF THE DRAWINGS

Exemplary embodiments of the invention are illustrated in the drawing and will be explained in more detail in the following description. In the drawing:

FIGS. 3A and 3B show a truncated sectional view along the line III-III of FIG. 2, in two different operational positions;

DESCRIPTION OF PREFERRED EMBODIMENTS

Figure 1:
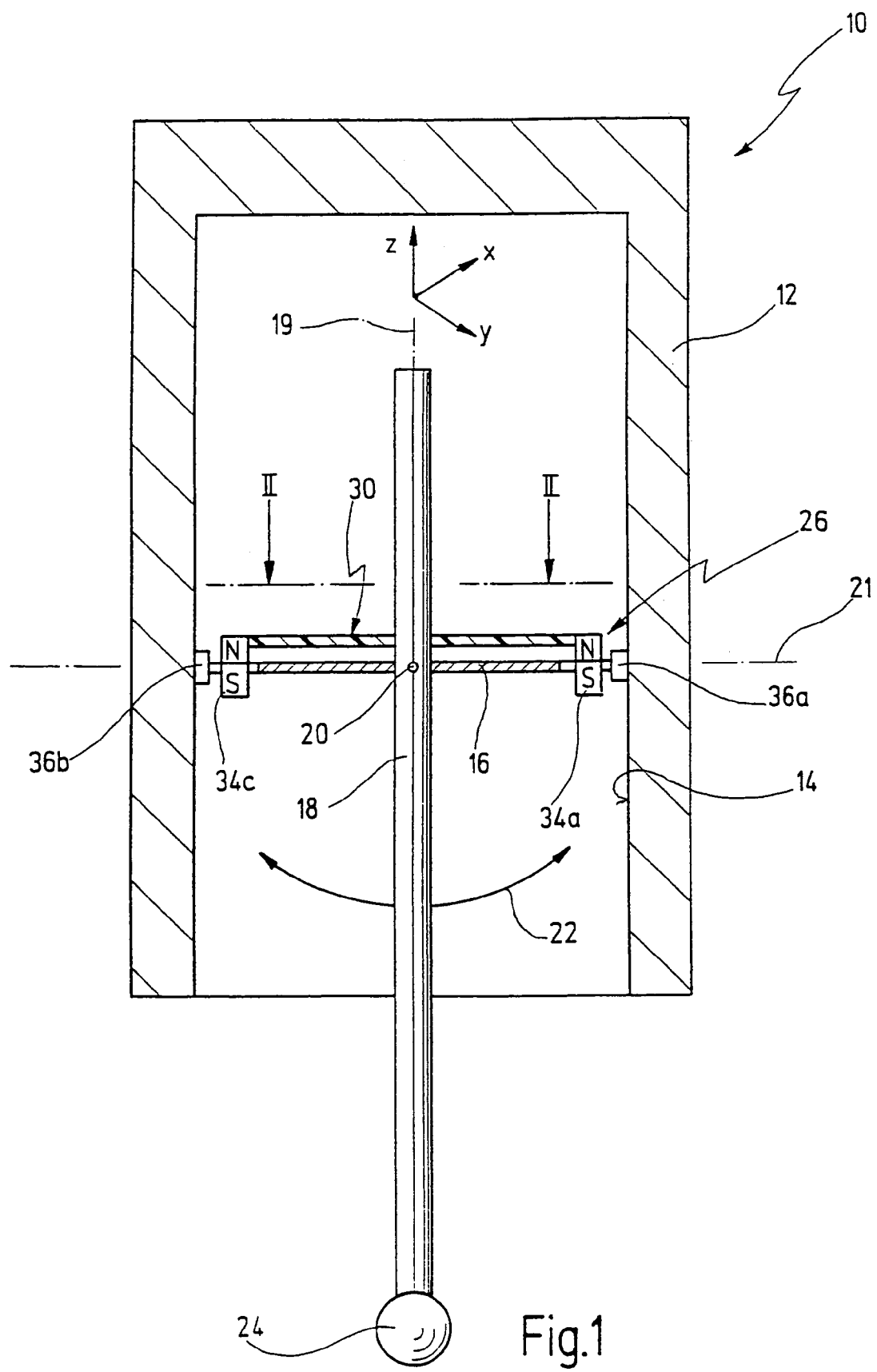
FIG. 1 shows an extremely schematic sectional side view of a first exemplary embodiment of a probe head according to the invention, along the line I-I in FIG. 2.

In FIGS. 1 to 4, reference numeral 10 denotes a probe head for three-dimensional measurements by means of a coordinate measuring machine. The probe head 10 has a housing 12 with an axially extending inner wall 14. A diaphragm 16 is clamped on the circumference of the axial inner wall 14. At its center, the diaphragm 16 supports a stylus 18 whose axis 19 coincides with the longitudinal axis of the housing 12 in the rest position of the stylus 18, shown in FIG. 1. Moreover, axis 19 lies on the so-called Z-axis of the probe head 10, whose transverse axes are denoted in the usual way by X and Y.

The probe head 18 is thereby cardanically mounted at a fulcrum 20 at the center of the diaphragm 16, the diaphragm 16 simultaneously forming the so-called cardan plane 21 in the rest position. The stylus 18 can thus be swiveled in the X-Y plane about the fulcrum 20, as indicated by an arrow 22.

The stylus 18 terminates at its lower end in a contact sphere 24.

For sake of clarity, only the X-Y measuring system is shown in FIG. 1, whereas the Z-measuring system is not shown here.

Figure 2:
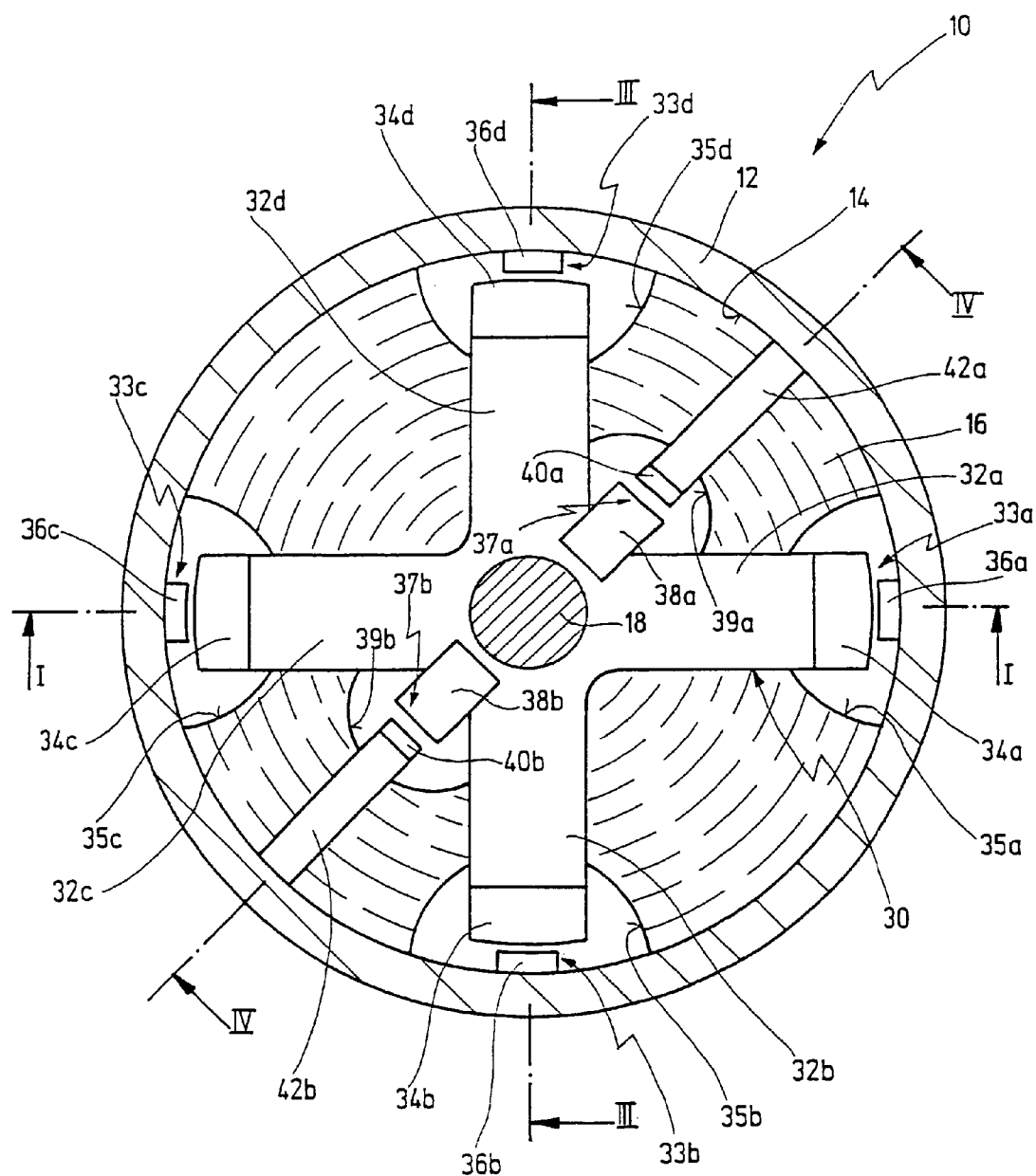
FIG. 2 shows, on an enlarged scale, a plan view of the interior of the probe head in accordance with FIG. 1, in the view II-II of FIG. 1.

Further details of the probe head 10 are now to be explained with reference to FIGS. 2 to 4:

Located on the stylus 18 somewhat above the cardan plane 21 is a star-shaped holder 30 that protrudes radially from the stylus 18 with four arms 32a to 32d, and is rigidly connected to said stylus.

Located at the free ends of the arms 32a to 32d are first Hall sensors 33a to 33d which serve for detecting the swiveling movement of the stylus 18 in the X-Y plane, i.e. about the fulcrum 20.

The first Hall sensors 33a to 33d comprise first permanent magnets 34a to 34d that are arranged at the free ends of the arms 32a to 32d. The first permanent magnets 34a to 34d project through first cutouts 35a to 35d at the circumference of the diaphragm 16. Located directly opposite them are first Hall elements 36a to 36d that are arranged at the axial inner wall 14 of the housing 12 in such a way that only very small air gaps remain between the first permanent magnets 34a to 34d and the first Hall elements 36a to 36d.

Second Hall sensors 37a, 37b are provided for detecting a displacement of the stylus 18 in the Z-direction. Said sensors are located directly at the stylus 18 in two diametrically opposite positions. Second permanent magnets 38a, 38b are supported by the holder 30 and project through second cutouts 39a, 39b in the diaphragm, 16. The associated second Hall elements 40a, 40b are located at the free end of arms 42a, 42b that protrude radially from the axial inner wall 14 of the housing 12.

FIG. 3A indicates that the first permanent magnets 34a to 34d are aligned parallel to the axis 19 of the stylus 18 with their axis 44, which is defined by the poles N and S. The same applies for the second permanent magnets 38a, 38b.

Furthermore, the first permanent magnets 34a to 34d are positioned in the Z-direction such that their symmetry plane 45 is located precisely in the cardan plane 21 between the poles N and S in the rest position of the stylus 18 (FIG. 1 and FIG. 3A). This also applies in the same way for the second permanent magnets 38a, 38b.

The first permanent magnets 34a to 34d are all identically aligned in the direction of the axis 19. In the exemplary embodiment illustrated, all the North Poles N are at the top. By contrast therewith, the second permanent magnets 38a, 38b are oppositely aligned, as is clearly shown in FIGS. 4A and 4B.

Finally, it is further indicated in FIG. 3A that the surface 46, facing the first Hall element 36a, of the first permanent magnet 34a is designed, just like the opposite surface 48 of the first Hall element 36a, to be spherical, with the spherical radius corresponding precisely to the spacing of the respective surface from the fulcrum 20.

Figure 4A:
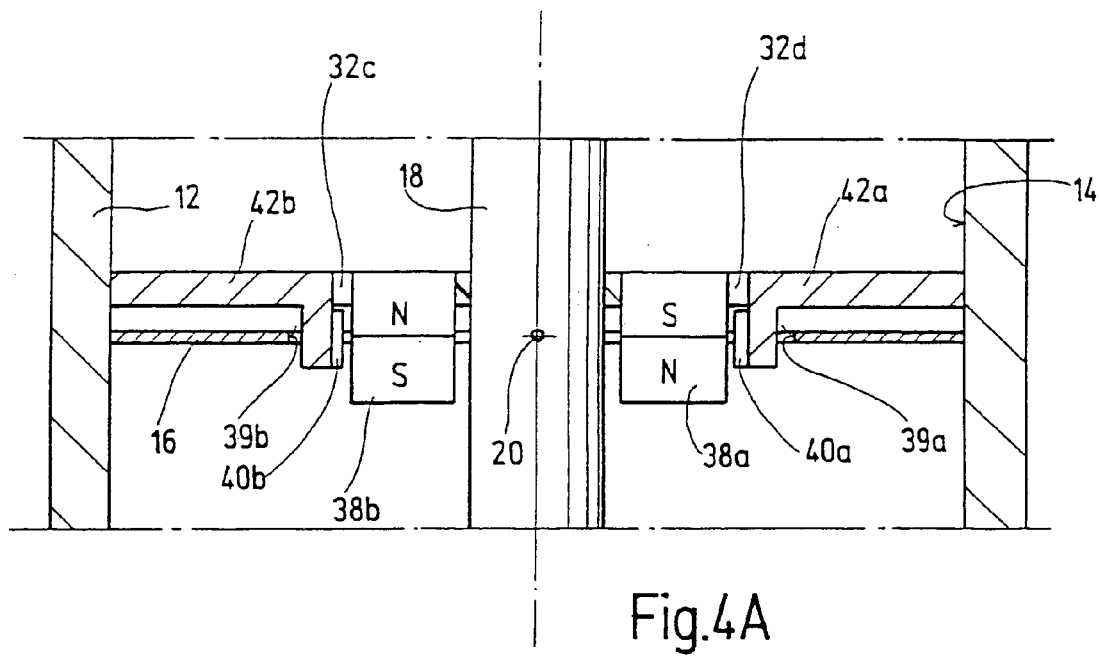
FIGS. 4A and 4B show illustrations similar to FIGS. 3A and 3B, but in a view along the line IV-IV of FIG. 2.

The mode of operation of the probe head 10 in accordance with FIGS. 1 to 4 is as follows:

When the stylus 18 is located in the rest position in accordance with FIGS. 1, 3A and 4A, a zero signal is present both at the first Hall sensors 33a to 33d for detecting swiveling in the X-Y plane, and at the second Hall sensors 37a, 37b detecting swiveling in the Z-direction. This is the case because the field lines of the permanent magnets 34a to 34d and 38a, 38b respectively, symmetrically penetrate the Hall elements 36a to 36d, and 40a, 40b respectively, assigned to them.

FIG. 3B shows the situation when the stylus 18 is swiveled out of its rest position 18 into a swiveled position 18', the swivel angle in FIG. 3B being denoted by α. In FIG. 3B, the reference symbols of all the swiveled elements are marked by the addition of a prime.

Figure 5:
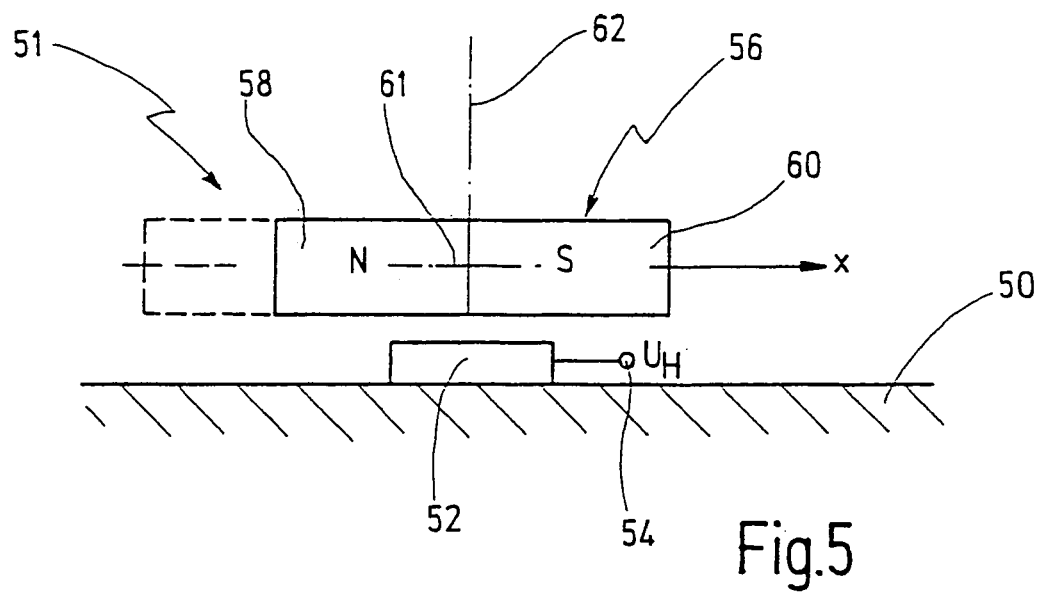
FIG. 5 shows a schematic side view of a Hall sensor as used within the context of the present invention.
Figure 6:
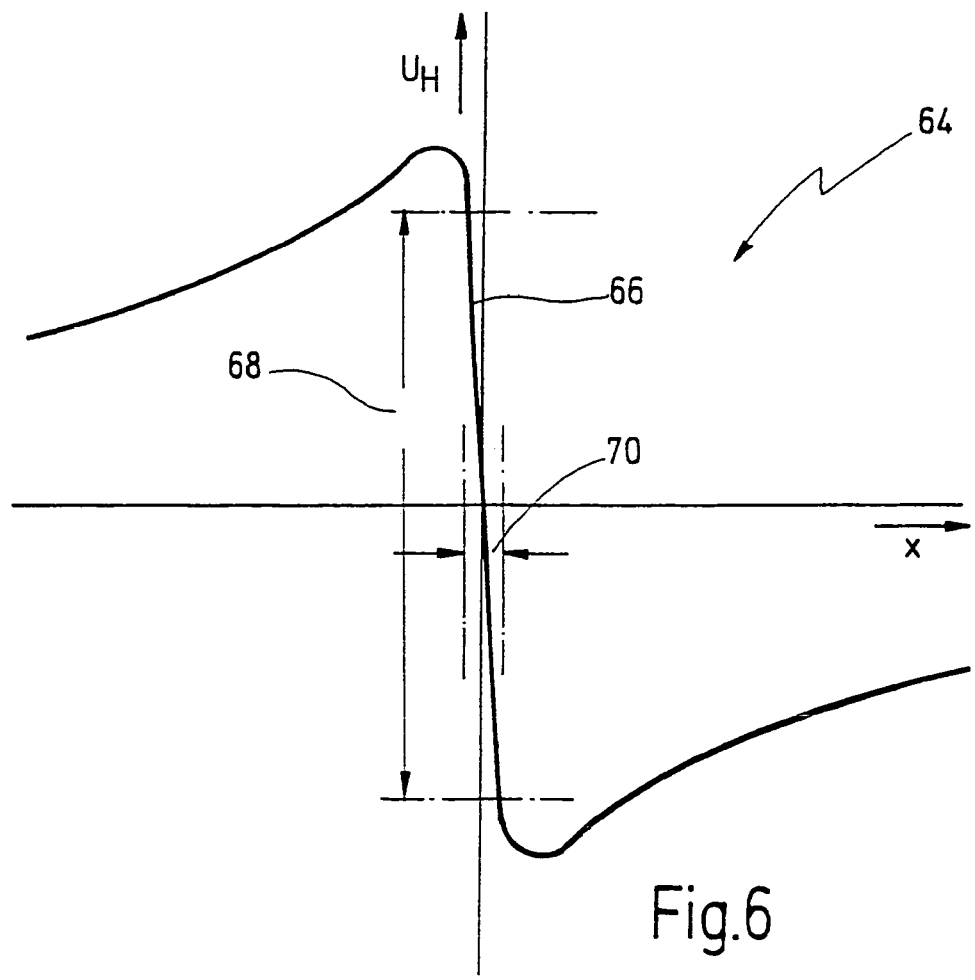
FIG. 6 shows a diagram representing the Hall voltage against the travel, for the sensor in accordance with FIG. 5.

As may easily be seen, the signals, that is to say the Hall voltages, change in opposite directions at the Hall elements 36a, 36c, for which purpose reference may briefly be made to the illustrations of FIGS. 5 and 6:

In FIG. 5, 50 denotes a base fixed to the housing and on which a Hall sensor 51 is located. The Hall element 52 of the latter is permanently connected to the base 50. A Hall voltage $U_H$ can be tapped at a connection 54 of the Hall element 52.

The permanent magnet 56 of the Hall sensor 51 is moved across the Hall element 52 at a slight spacing. This takes place in such a way that the axis 61, defined by the North Pole 58 and the South Pole 60, of the permanent magnet 56 coincides with the direction x of movement.

In the basic position illustrated in FIG. 5, the plane 62 of symmetry of the permanent magnet 56 lies exactly in the middle over the Hall element 52. This is therefore penetrated symmetrically by the field lines of the permanent magnet 56 such that Hall effects occur in the Hall element 52 on both sides of the plane 62 of symmetry which are exactly symmetrical but oppositely directed, and so the charge carriers are deflected in an identical way but in an opposite direction.

If the permanent magnet 56 is now moved in a direction of the axis 61 from left to right beyond the Hall element 52, a Hall voltage $U_H$ over the travel x can be tapped at the terminal 54 as illustrated in the diagram 64 of FIG. 6.

It is to be seen that the Hall voltage $U_H$ traverses a zero crossing from plus to minus, a preferably linear range 66 being set up in the region of the zero crossing such that a corresponding dependence of the Hall voltage $U_H$ on the travel x can be assumed within a voltage range 68 or a travel range 70. If the Hall element 52 inherently has a non-linear characteristic curve, this can be linearized by means of correction values or the like determined in advance.

If the situation according to FIGS. 3A and 3B is now considered again, it is easy to see that exactly opposed Hall voltages are present at the first Hall elements 36a and 36c in the case of a pure swiveling movement by an angle α in accordance with FIG. 3B. This is an indication that a pure swiveling movement is present.

If the stylus 18 were displaced only along its axis 19, as indicated by ΔZ in FIG. 3A and dashed and dotted, as well as by arrows, this would result at the first Hall elements 36a and 36c in identical signals that could be counted out with the aid of conventional means in order to avoid falsification in the measurement of the swiveling.

It is further to be seen from FIGS. 3A and 3B that the relatively long arms 32a to 32d effect a large transmission of the swiveling of the stylus 18 at the measuring point of the first Hall sensors 33a to 33d.

Figure 4B:
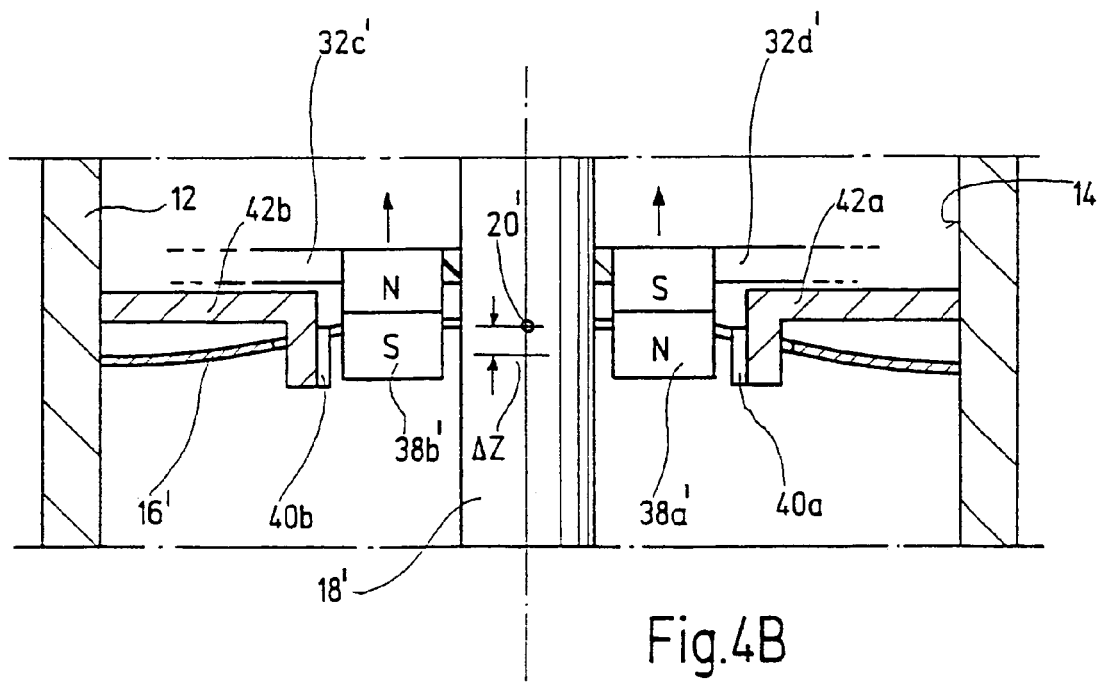

FIGS. 4A and 4B show the situation in connection with the measurement of the displacement of the stylus 18 along the Z-axis, with FIG. 4A again illustrating the initial situation, and FIG. 4B illustrating the measuring situation, in which the stylus 18 has been displaced from the rest position 18 to 18', as illustrated by ΔA in FIG. 4B.

As a consequence of the opposite alignment of the second permanent magnets 38A, 38B, this now yields the same result as was previously stated in relation to FIGS. 3A and 3B. In the case of the quantity to be measured, specifically in the case of a linear displacement of the stylus 18 in the Z-direction, opposite voltages are present at the two Hall elements 40a, 40b while identical signals are produced in the case of the quantity not to be measured, specifically in the case of a swiveling of the stylus 18. Here, as well, it is thus possible to separate signals into desired and undesired ones.

Since no transmission of the movement takes place when measuring the displacement in the Z-direction, the measurement is thus performed in the vicinity of the stylus 18 here, which is again in contrast to the situation of FIGS. 3A and 3B.

Figure 7:
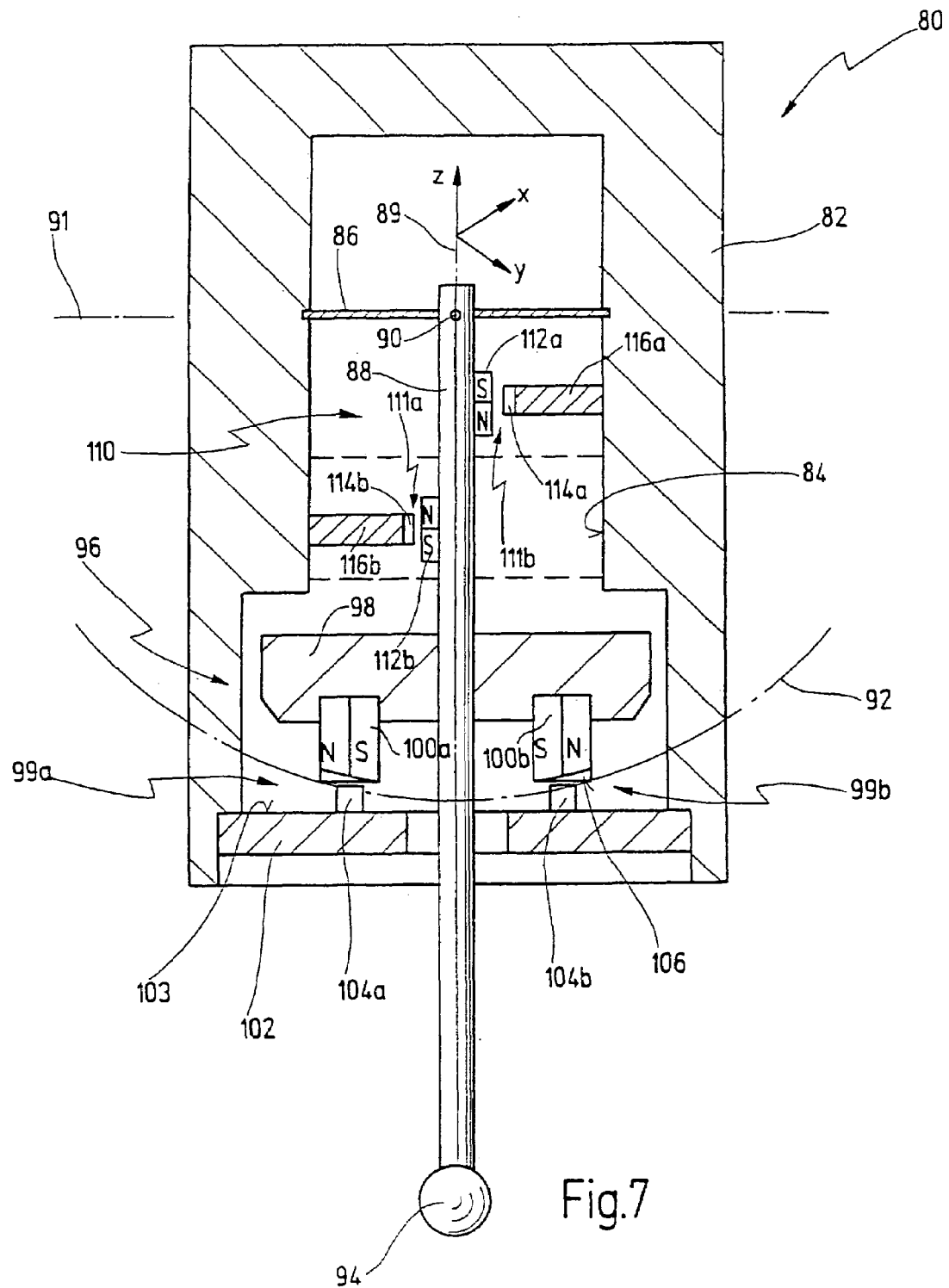
FIG. 7 shows an illustration, similar to FIG. 1, but for a second exemplary embodiment of a probe head according to the invention.

Finally, FIG. 7 shows yet another exemplary embodiment of a probe head 80.

The probe head 80 again comprises a housing 82 with an interior 84 in which a diaphragm 86 is clamped.

The diaphragm 86 supports a stylus 88 whose longitudinal axis is denoted by 89. The stylus 88 again is suspended at the center of the diaphragm 86, such that a fulcrum 90 and a cardan plane 91 are defined there.

A circle or a spherical surface 92 indicates here that the measurement of the swiveling of the stylus 88 takes place at a spacing from the cardan plane 91.

A contact sphere 94 is located once again at the lower end of the stylus 88.

A first sensor arrangement 96 serves for measuring the swiveling of the stylus 88 in the X-Y plane. The first sensor arrangement 96 comprises a first holder 98 that is designed as a plate in a radial plane of the stylus 88 and rigidly connected to the latter.

Located below the first holder 98 are first Hall sensors, of which only two are to be seen in FIG. 7, specifically the Hall sensors 99a and 99b. However, four such Hall sensors are provided, offset by 90° in each case, around the stylus 88.

The Hall sensors 99a, 99b comprise first permanent magnets 100a, 100b.

Located at the lower end of the housing 82 is a second holder 102, which forms a radial inner wall 103 of the housing 82 facing to the top. Located on this inner wall 103 are first Hall elements 104a, 104b that form the first Hall sensors 99a, 99b together with the first permanent magnets 100a, 100b.

106 indicates that here, as well, the mutually opposite surfaces of the permanent magnets 100a, 100b or Hall elements 104a, 104b have the shape of a spherical surface whose radius is determined by the circle or the spherical surface 92. Here, as well, the effect of swiveling the stylus 88 about the fulcrum 90 is that the air gap between the first permanent magnets 100a, 100b and the first Hall elements 104a, 104b is constant.

Located in the upper region of the stylus 88, between the fulcrum 90 and first holder 98, is a second sensor arrangement 110 that serves for measuring the displacement of the stylus 88 in the Z-direction.

The second sensor arrangement 110 comprises two Hall sensors 111a, 111b that are arranged at an axial spacing from one another on opposite sides of the stylus 88. The second Hall sensors 111a, 111b each comprise second permanent magnets 112a, 112b and second Hall elements 114a, 114b. The latter are located at the free ends of arms 116a, 116b that protrude radially from the inner wall 84 of the housing 82.

When the stylus 88 is swiveled about the fulcrum 90, the first permanent magnets 100a, 100b move past the first Hall elements 104a, 104b, and a signal profile corresponding to FIG. 6 is obtained here as well.

A corresponding statement holds for a movement of the stylus 88 in the Z-direction when the second permanent magnets 112a, 112b move past the second Hall elements 114a, 114b.

What is claimed is:

1. A probe head for a coordinate measuring machine, comprising:
    a housing,
    a stylus resiliently suspended in the housing, and
    a sensor arrangement for detecting deflections of the stylus relative to the housing, the sensor arrangement comprising a first Hall sensor having a first magnet and a first Hall element arranged in a vicinity of the first magnet and a second Hall sensor having a second magnet and a second Hall element arranged in a vicinity of the second magnet, with the first Hall sensor being designed for providing a first Hall voltage as a function of a deflection of the stylus in a direction perpendicular to the stylus, and with the second Hall sensor being designed for providing a second Hall voltage as a function of a deflection of the stylus in a direction parallel to the stylus, and
    wherein each of the first and second magnets has a North Pole and a South Pole, and
    wherein each of the first and second magnets is arranged for laterally passing by the respective first and second Hall elements in a direction from the North Pole to the South Pole or vice versa, when the stylus is deflected, such that a Hall voltage having a polarity change and a voltage range around the polarity change is generated by the Hall elements,
    wherein the sensor arrangement is adapted to process said voltage range for providing a continuous measure of the deflection of the stylus, and
    wherein the stylus is suspended for swiveling about a fulcrum defining a radial plane perpendicular to the stylus, wherein the first magnet has a first symmetry plane defined between its North Pole and its South Pole, and wherein the first magnet is located with the first symmetry plane lying in the radial plane, when the stylus is in rest position.

2. The probe head of claim 1, further comprising a holder extending radially away from the stylus, wherein the first magnet is arranged on the holder.

3. The probe head of claim 1, wherein the housing comprises an axial inner wall extending in a direction parallel to the stylus, the first Hall element being arranged on the axial inner wall.

4. A probe head for a coordinate measuring machine, comprising:
    a housing,
    a stylus resiliently suspended in the housing, and
    a sensor arrangement for detecting deflections of the stylus relative to the housing, the sensor arrangement comprising a first Hall sensor having a first magnet and having a first Hall element arranged in a vicinity of the first magnet and a second Hall sensor having a second magnet and a second Hall element arranged in a vicinity of the second magnet, with the first Hall sensor being designed for providing a first Hall voltage as a function of a deflection of the stylus in a direction perpendicular to the stylus, and with the second Hall sensor being designed for providing a second Hall voltage as a function of a deflection of the stylus in a direction parallel to the stylus, and
    wherein each of the first and second magnets has a North Pole and a South Pole, and
    wherein each of the first and second magnets is arranged for laterally passing by the respective first and second Hall elements in a direction from the North Pole to the South Pole or vice versa, when the stylus is deflected, such that a Hall voltage having a polarity change and a voltage range around the polarity change is generated by the Hall elements, and wherein the sensor arrangement is adapted to process said voltage range for providing a continuous measure of the deflection of the stylus, and wherein the second magnet has a second symmetry plane defined between its North Pole and its South Pole, and wherein the second magnet is located with the second symmetry plane lying in the radial plane, when the stylus is in rest position.

5. A probe head for a coordinate measuring machine, comprising:

a housing, a stylus resiliently suspended in the housing, and a sensor arrangement for detecting deflections of the stylus relative to the housing, the sensor arrangement comprising a first Hall sensor having a first magnet and having a first Hall element arranged in a vicinity of the first magnet and a second Hall sensor having a second magnet and a second Hall element arranged in a vicinity of the second magnet, with the first Hall sensor being designed for providing a first Hall voltage as a function of a deflection of the stylus in a direction perpendicular to the stylus, and with the second Hall sensor being designed for providing a second Hall voltage as a function of a deflection of the stylus in a direction parallel to the stylus, and wherein each of the first and second magnets has a North Pole and a South Pole, and wherein each of the first and second magnets is arranged for laterally passing by the respective first and second Hall elements in a direction from the North Pole to the South Pole or vice versa, when the stylus is deflected, such that a Hall voltage having a polarity change and a voltage range around the polarity change is generated by the Hall elements, and wherein the sensor arrangement is adapted to process said voltage range for providing a continuous measure of the deflection of the stylus, and further comprising a diaphragm for cardanically suspending the stylus in the housing, wherein the diaphragm comprises at least one cutout, with the first and second magnets projecting into the cutout.

6. A probe head for a coordinate measuring machine, comprising:

a housing, a stylus resiliently suspended in the housing, and a sensor arrangement for detecting deflections of the stylus relative to the housing, the sensor arrangement comprising a first Hall sensor having a first magnet and having a first Hall element arranged in a vicinity of the first magnet and a second Hall sensor having a second magnet and a second Hall element arranged in a vicinity of the second magnet, with the first Hall sensor being designed for providing a first Hall voltage as a function of a deflection of the stylus in a direction perpendicular to the stylus, and with the second Hall sensor being designed for providing a second Hall voltage as a function of a deflection of the stylus in a direction parallel to the stylus, and wherein each of the first and second magnets has a North Pole and a South Pole, and wherein each of the first and second magnets is arranged for laterally passing by the respective first and second Hall elements in a direction from the North Pole to the South Pole or vice versa, when the stylus is deflected, such that a Hall voltage having a polarity change and a voltage range around the polarity change is generated by the Hall elements, and wherein the sensor arrangement is adapted to process said voltage range for providing a continuous measure of the deflection of the stylus, and wherein the stylus is suspended for swiveling about a fulcrum defining a radial plane perpendicular to the stylus, and wherein the first magnet and the first Hall element are located with an axial spacing from the radial plane.

7. The probe head of claim 6, further comprising a holder extending radially away from the stylus, wherein the first magnet is arranged on the holder.

8. The probe head of claim 7, wherein the first magnet has a longitudinal axis extending from the North Pole to the South Pole, the first magnet being arranged with the longitudinal axis substantially orthogonal to the stylus.

9. The probe head of claim 6, wherein the housing comprises a radial inner wall extending in a direction orthogonal to the stylus, the first Hall element being arranged on the radial inner wall.

10. The probe head of claim 6, further comprising an arm extending from the housing in a direction orthogonal to the stylus, wherein the second Hall element is arranged on said arm and the second magnet is arranged on the stylus.

11. A probe head for a coordinate measuring machine, comprising:

a housing, a stylus resiliently suspended in the housing, and a sensor arrangement for detecting deflections of the stylus relative to the housing, the sensor arrangement comprising at least one Hall sensor having a magnet and having a Hall element arranged in a vicinity of the magnet, and wherein the magnet has a North Pole and a South Pole, and wherein the magnet is arranged for laterally passing by the Hall element in a direction from the North Pole to the South Pole or vice versa, when the stylus is deflected, such that a Hall voltage having a polarity change and a voltage range around the polarity change is generated by the Hall element, and wherein the sensor arrangement is adapted to process said voltage range for providing a continuous measure of the deflection of the stylus, and wherein the magnet and the Hall element each are provided with spherical surfaces for maintaining a constant air gap between the magnet and the Hall element during swiveling movement of the stylus.

* * * * *